US010089202B1

(12) United States Patent
Gaurav et al.

(10) Patent No.: US 10,089,202 B1
(45) Date of Patent: Oct. 2, 2018

(54) PROVIDING DATA HIGH AVAILABILITY TO A SET OF HOST COMPUTERS VIA AUTOMATIC FAILOVER

(71) Applicant: EMC IP Holding Company LLC, Hopkinton, MA (US)

(72) Inventors: Natasha Gaurav, Hopkinton, MA (US); Himabindu Tummala, South Grafton, MA (US); Santosh PasulaReddy, Westborough, MA (US); Girish Sheelvant, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 184 days.

(21) Appl. No.: 14/982,625

(22) Filed: Dec. 29, 2015

(51) Int. Cl.
*G06F 11/20* (2006.01)
*G06F 11/16* (2006.01)
*G06F 11/14* (2006.01)
*G06F 3/06* (2006.01)

(52) U.S. Cl.
CPC .......... *G06F 11/2094* (2013.01); *G06F 3/065* (2013.01); *G06F 3/067* (2013.01); *G06F 11/1415* (2013.01); *G06F 11/1423* (2013.01); *G06F 11/1658* (2013.01); *G06F 11/1662* (2013.01); *G06F 11/20* (2013.01); *G06F 11/201* (2013.01); *G06F 11/2023* (2013.01); *G06F 11/2056* (2013.01); *G06F 3/0619* (2013.01); *G06F 2201/85* (2013.01)

(58) Field of Classification Search
CPC .... G06F 11/1415; G06F 3/0619; G06F 3/065; G06F 3/067
See application file for complete search history.

(56) References Cited

U.S. PATENT DOCUMENTS

| | | | | |
|---|---|---|---|---|
| 5,787,242 A | * | 7/1998 | DeKoning | G06F 11/1471 711/E12.019 |
| 6,629,264 B1 | * | 9/2003 | Sicola | G06F 11/2007 714/15 |
| 6,823,477 B1 | * | 11/2004 | Cheng | G06F 11/2007 710/316 |
| 6,915,448 B2 | * | 7/2005 | Murphy | G06F 11/1662 714/41 |
| 7,246,207 B2 | | 7/2007 | Kottomtharayil et al. | |
| 8,107,467 B1 | * | 1/2012 | Madnani | H04L 29/12047 370/383 |
| 2003/0187853 A1 | | 10/2003 | Hensley et al. | |

(Continued)

*Primary Examiner* — Paul Contino
(74) *Attorney, Agent, or Firm* — BainwoodHuang

(57) ABSTRACT

A technique provides data high availability to a set of host computers. The technique involves, while a production array provides the set of host computers with access to a production logical unit of storage (LUN), replicating data from the production LUN to a replicated LUN on a replication array. The technique further involves, after replicating at least some of the data from the production LUN to the replicated LUN, electronically detecting a production array deficiency. The technique further involves, in response to electronically detecting the production array deficiency, automatically performing, by electronic circuitry, a failover operation which (i) terminates providing the set of host computers with access to the production LUN and (ii) provides the set of host computers with access to the replicated LUN on the replication array.

19 Claims, 5 Drawing Sheets

(56) References Cited

U.S. PATENT DOCUMENTS

| | | | |
|---|---|---|---|
| 2003/0188233 A1* | 10/2003 | Lubbers | G06F 11/2069 |
| | | | 714/100 |
| 2005/0188243 A1 | 8/2005 | Adams et al. | |
| 2006/0112219 A1* | 5/2006 | Chawla | G06F 3/0607 |
| | | | 711/114 |
| 2006/0182050 A1* | 8/2006 | Dohm | G06F 11/2056 |
| | | | 370/312 |
| 2007/0198700 A1* | 8/2007 | Vivian | G06F 11/2097 |
| | | | 709/224 |
| 2008/0147878 A1* | 6/2008 | Kottomtharayil | G06F 17/30082 |
| | | | 709/235 |
| 2009/0240975 A1* | 9/2009 | Shitomi | G06F 3/061 |
| | | | 714/5.11 |
| 2012/0303999 A1* | 11/2012 | Calder | G06F 11/1471 |
| | | | 714/6.3 |
| 2014/0201171 A1 | 7/2014 | Vijayan et al. | |
| 2014/0358985 A1* | 12/2014 | Kotecha | H04L 65/1063 |
| | | | 709/202 |
| 2015/0067002 A1* | 3/2015 | Shvachko | G06F 17/30215 |
| | | | 707/827 |
| 2015/0212910 A1* | 7/2015 | Gondi | G06F 11/2033 |
| | | | 714/6.3 |
| 2015/0278049 A1* | 10/2015 | Saito | G06F 3/0617 |
| | | | 714/6.3 |
| 2016/0078245 A1 | 3/2016 | Amarendran et al. | |
| 2016/0080489 A1 | 3/2016 | Ngo | |
| 2016/0170843 A1* | 6/2016 | Yamaguchi | G06F 3/0604 |
| | | | 711/162 |
| 2016/0179393 A1* | 6/2016 | Masuda | G06F 3/065 |
| | | | 711/165 |
| 2016/0210209 A1* | 7/2016 | Verkaik | G06F 11/2033 |

\* cited by examiner

PROVIDING DATA HIGH AVAILABILITY TO A SET OF HOST COMPUTERS VIA AUTOMATIC FAILOVER

BACKGROUND

While a host device accesses data on a primary system, data storage replication maintains a copy of the data on a secondary system. In particular, as the host device writes new data to the primary system, the write operation is also performed on the secondary system thus providing data redundancy.

If access to data on the primary system is lost, the secondary system provides manual failover capability. That is, a human administrator is able to change the secondary system from a read only mode to a read/write mode, thus enabling the host device to continue to access the data (e.g., to write new data) using the secondary system.

SUMMARY

Unfortunately, there are drawbacks to the above described manual failover process which must take place when providing access to data using a secondary system once access to the data on a primary system is lost. For example, the work of a human administrator to change the secondary system from a read only mode to a read/write mode is burdensome and vulnerable to human error. Additionally, access to the data may be unnecessarily delayed if the human administrator does not perform the change as quickly as possible.

In contrast to the above-described conventional manual failover process, improved techniques are directed to providing data high availability to a set of host computers (i.e., one or more hosts) via automatic failover. In particular, data is replicated from a production location to a replication location. The operation of the production location is monitored and, in response to detection of a deficiency of the production location (e.g., reaching a low free storage threshold, failure of an internal component, etc.), failover to the replication location is automatically performed. Accordingly, there is minimal burden and opportunity for error placed on a user if any. Additionally, failover and the resulting access to the data from the replication location is not unnecessarily delayed while waiting for a human to intervene.

One embodiment is directed to a computer-implemented method of providing data high availability to a set of host computers. The computer-implemented method includes, while a production array provides the set of host computers with access to a production logical unit of storage (LUN), replicating data from the production LUN to a replicated LUN on a replication array. The method further includes, after replicating at least some of the data from the production LUN to the replicated LUN, electronically detecting a production array deficiency. The method further includes, in response to electronically detecting the production array deficiency, automatically performing, by electronic circuitry, a failover operation which (i) terminates providing the set of host computers with access to the production LUN and (ii) provides the set of host computers with access to the replicated LUN on the replication array.

In some arrangements, each LUN has a replication setting. Along these lines, while the production array provides the set of host computers with access to the production LUN and data is replicated from the production LUN to the replicated LUN, the replication setting of the production LUN on the production array is set to "SOURCE". Additionally, while the production array provides the set of host computers with access to the production LUN and data is replicated from the production LUN to the replicated LUN, the replication setting of the replicated LUN on the replication array is set to "DESTINATION". In these arrangements, performing the failover operation includes modifying the replication setting of the replicated LUN on the replication array from "DESTINATION" to "SOURCE".

In some arrangements, the production LUN resides in a particular storage pool having a priority setting. That is, the electronic circuitry is constructed and arranged to automatically failover LUNs residing in critical storage pools having priority settings set to "critical" and not automatically failover LUNs residing in non-critical storage pools having priority settings set to "non-critical". In these arrangements, automatically performing the failover operation includes reading the priority setting of the particular storage pool, detecting that the priority setting of the particular storage pool is set to "critical", and initiating the failover operation in response to detection that the priority setting of the particular storage pool is set to "critical".

In some arrangements, the electronic circuitry maintains a replication list for the production array, the replication list listing multiple LUNs. In these arrangements, automatically performing the failover operation includes, in response to electronically detecting the production array deficiency, failing over each LUN of the multiple LUNs listed by the replication list, the multiple LUNs including the production LUN.

In some arrangements, automatically performing the failover operation includes initiating the failover operation in response to a result of an internal status assessment of the production array indicating that the production array has the production array deficiency. For example, initiating the failover operation may include discovering that the production array has sustained a component failure which has caused operation of the production array to degrade, and commencing the failover operation in response to discovery that the production array has sustained the component failure.

As another example, the production LUN may reside in a particular storage pool. Here, initiating the failover operation may include discovering that a level of remaining free storage in the particular storage pool has reached a predefined threshold, and commencing the failover operation in response to discovery that the level of remaining free storage in the particular storage pool has reached the predefined threshold.

In some arrangements, the method further includes, prior to commencing the failover operation, adding free storage from a set of standby storage devices to the particular storage pool. Such operation extends the particular storage pool and delays commencement of the failover operation.

In some arrangements, replicating data from the production LUN to the replicated LUN occurs synchronously. In these arrangements, automatically performing the failover operation includes completing the failover operation with no loss of data between the production array and the replication array.

In other arrangements, replicating data from the production LUN to the replicated LUN occurs asynchronously. In these arrangements, automatically performing the failover operation includes completing the failover operation with a controlled a maximum loss of data between the production array and the replication array (e.g., one minute, two minutes, five minutes, etc.).

Another embodiment is directed to electronic circuitry which includes memory, and control circuitry coupled to the memory. The memory stores instructions which, when carried out by the control circuitry, cause the control circuitry to:
  (A) while a production array provides a set of host computers with access to a production LUN, replicate data from the production LUN to a replicated LUN on a replication array,
  (B) after replicating at least some of the data from the production LUN to the replicated LUN, electronically detect a production array deficiency, and
  (C) in response to electronically detecting the production array deficiency, automatically perform a failover operation which (i) terminates providing the set of host computers with access to the production LUN and (ii) provides the set of host computers with access to the replicated LUN on the replication array.

Yes another embodiment is directed to a computer program product having a non-transitory computer readable medium which stores a set of instructions to provide data high availability to a set of host computers. The set of instructions, when carried out by computerized circuitry, causing the computerized circuitry to perform a method of:
  (A) while a production array provides the set of host computers with access to a production LUN, replicating data from the production LUN to a replicated LUN on a replication array;
  (B) after replicating at least some of the data from the production LUN to the replicated LUN, electronically detecting a production array deficiency; and
  (C) in response to electronically detecting the production array deficiency, automatically performing a failover operation which (i) terminates providing the set of host computers with access to the production LUN and (ii) provides the set of host computers with access to the replicated LUN on the replication array.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in providing data high availability to a set of host computers via automatic failover.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to providing data high availability to a set of host computers via automatic failover. In particular, data is replicated from a production site to a replication site. The operation of the production site is monitored and, in response to detection of a deficiency of the production site, failover to the replication site is automatically performed. Accordingly, there is minimal burden and opportunity for error placed on a user, if any. Furthermore, failover and the resulting access to the data from the replication site is not unnecessarily delayed while waiting for a human to intervene.

Figure 1:
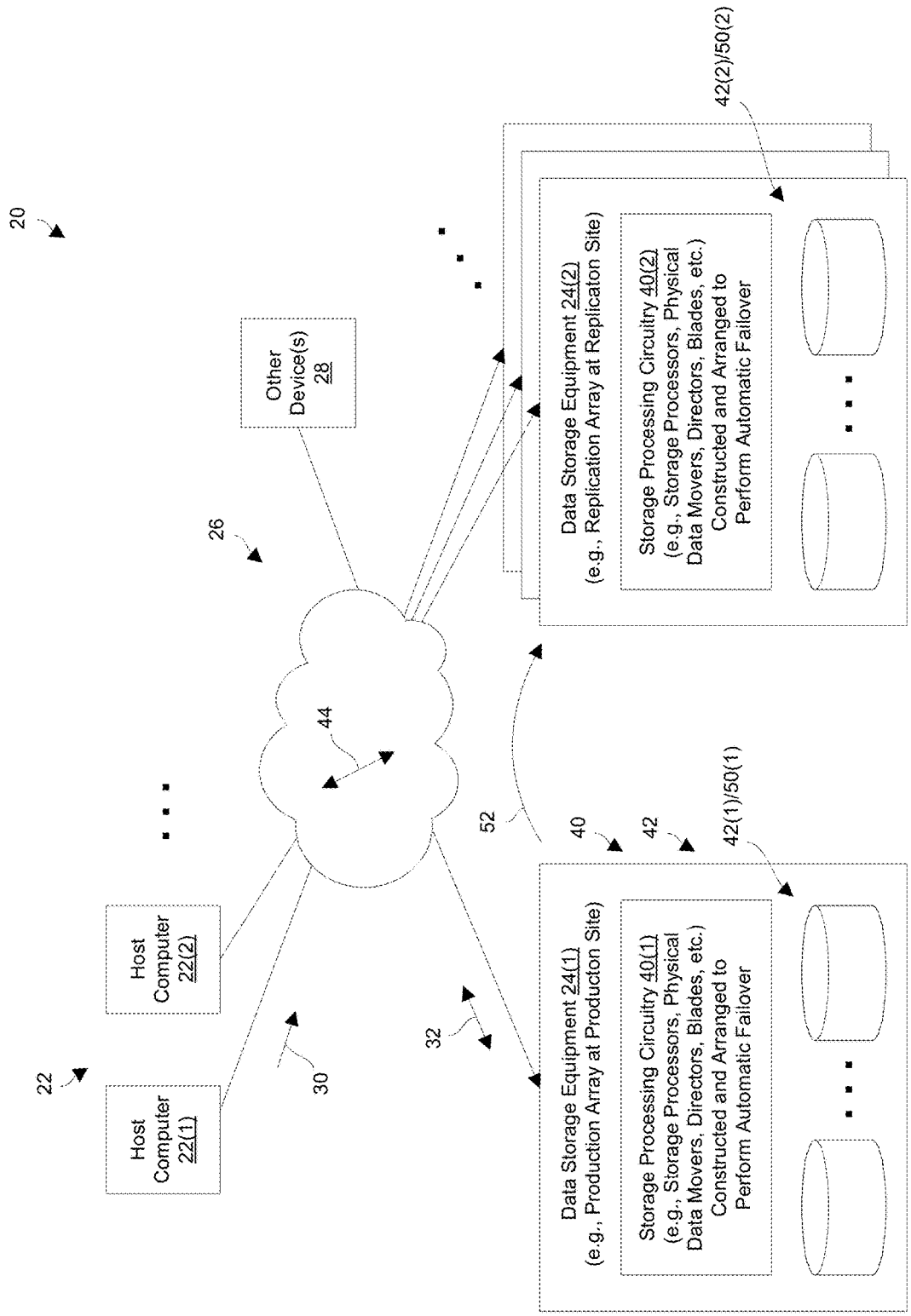
FIG. 1 is a block diagram of a data storage environment which provides data high availability via automatic failover.

FIG. 1 is a block diagram of a data storage environment 20 which provides data high availability via automatic failover. The data storage environment 20 includes host computers 22(1), 22(2), . . . (collectively, host computers 22 or simply hosts 22), data storage equipment 24(1), 24(2), . . . (collectively, data storage equipment 24), and a communications medium 26. Other devices 28 may reside in the data storage environment 20 as well.

Each host computer 22 is constructed and arranged to perform useful work. For example, a host computer 22 may operate as a web server, a file server, an email server, an enterprise server, and so on, which provides I/O requests 30 (e.g., small computer system interface or SCSI commands) to the data storage equipment 24 to store host data 32 in and read host data 32 from the data storage equipment 24.

The data storage equipment 24 is constructed and arranged to provide access to the host data 32 in response to the I/O requests 30 from the host computers 22. The data storage equipment 24(1) is independent of the data storage equipment 24(2) in that a failure of the data storage equipment 24(1) would not necessarily result in a failure of the data storage equipment 24(2), and vice versa. Along these lines, each particular data storage equipment 24 may have an independent power source (i.e., a different main power feed, separate paths to the host computers 22, etc.).

As shown, each data storage equipment 24(1), 24(2), . . . respectively includes storage processing circuitry 40 and a set of storage drives 42. The storage processing circuitry 40 may include one or more physical storage processors, data movers, director boards, blades, I/O modules, storage drive controllers, switches, combinations thereof, and so on. The storage processing circuitry 40 is constructed and arranged to process the I/O requests 30 from the host computers 22 by robustly and reliably storing host data 32 in the set of storage drives 42 and retrieving the host data 32 from the set of storage drives 42. Additionally, as will be explained in further detail shortly, the data storage equipment 24 is capable of performing automatic failover thus maintaining data high availability.

The communications medium 26 is constructed and arranged to connect the various components of the data storage environment 20 together to enable these components to exchange electronic signals 44 (e.g., see the double arrow 44). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting SAN-based communications, LAN-based communications, cellular communications, WAN-based communications, distributed infrastructure communications, other topologies, combinations thereof, etc.

During operation, the storage processing circuitry 40 of the data storage equipment 24 coordinate data storage and access to data. By way of example, the data storage equipment 24(1) operates as a production site which maintains a production logical unit of storage (LUN) 50(1) in the set of storage drives 42(1) of the data storage equipment 24(1). Additionally, the data storage equipment 24(2) operates as a replication site which maintains a replicated LUN 50(2) in the set of storage drives 42(2) of the data storage equipment 24(2). In this configuration, the host computers 22 are able write host data 32 to and read host data 32 from the production LUN 50(1). However, while the production LUN 50(1) is available for writing by the host computers 22, the host computers 22 are unable to write host data 32 to the replicated LUN 50(2) (although it may be possible for the host computers 22 to read host data 32 from the data storage equipment 24(2)).

As the host computers 22 continue to write and read host data 32 via the production LUN 50(1) on the data storage equipment 24(1), the storage processing circuitry 40(1), 40(2) operate to replicate the host data 32 to the replicated LUN 50(2) on the data storage equipment 24(2). In particular, new host data 32 that is written by the host computers 22 to the production LUN 50(1) is copied to the replicated LUN 50(2). Such operation makes the replicated LUN 50(2) available in response to a failure of the data storage equipment 24(1) (e.g., disaster recovery).

It should be understood that the production LUN 50(1) can be replicated to just one replication site (e.g., the data storage equipment 24(2)), or additionally to other data storage equipment 24 at other replication sites via advanced replication techniques (e.g., one-to-many replication, cascading replication, etc.). Additionally, it should be understood that the production site and the replication site(s) can be local (e.g., co-located), remote from each other (e.g., separated by large distances), combinations thereof, etc. Furthermore, it should be understood that replication of a LUN 50 is used throughout this disclosure, but that other data storage objects are suitable for use such as files, file systems, storage pools, and so on.

To replicate data between the production LUN 50(1) on the data storage equipment 24(1) and replicated LUN 50(2) on the data storage equipment 24(2), the storage processing circuitry 40(1), 40(2) establish a replication session 52. In particular, write operations from the host computers 22 to the production LUN 50(1) (e.g., see the host I/O requests 30) are copied (i.e., split) so that the same write operations are performed on the replicated LUN 50(2). In some arrangements, replication is synchronous in that the write operations from the host computers 22 are not acknowledged as being completed until the write operations are completed on both the production LUN 50(1) as well as the replicated LUN 50(2). In other arrangements, replication is asynchronous in that the write operations from the host computers 22 are acknowledged as being completed once they are completed on the production LUN 50(1) even though they may not be completed on the replicated LUN 50(2).

During the replication session 52, the data storage equipment 24(1), 24(2) maintain communication. For example, the data storage equipment 24(1) periodically sends a message to the data storage equipment 24(2) to communicate production LUN 50(1) availability, status, etc. Similarly, the data storage equipment 24(2) periodically sends a message to the data storage equipment 24(1) to communicate replicated LUN 50(2) availability, status, etc. If communication is lost (i.e., no message or heartbeat received within a predefined period of time) or if the communicated status indicates a deficiency in the production LUN 50(1), the data storage equipment 24 performs an analysis to determine whether to perform automatic failover.

Along these lines, suppose that a deficiency is detected in the data storage equipment 24(1) (e.g., the storage pool supporting the production LUN 50(1) reaches a low free storage threshold, failure of an internal component, etc.). In response to such detection, a failover process to other data storage equipment 24 (e.g., the data storage equipment 24(2)) may be automatically and immediately initiated. Accordingly, the data remains highly available. Moreover, there is no burden on a user to manually perform failover, and failover is able to occur with minimal delay, if any. Further details will now be provided with reference to FIG. 2.

Figure 2:
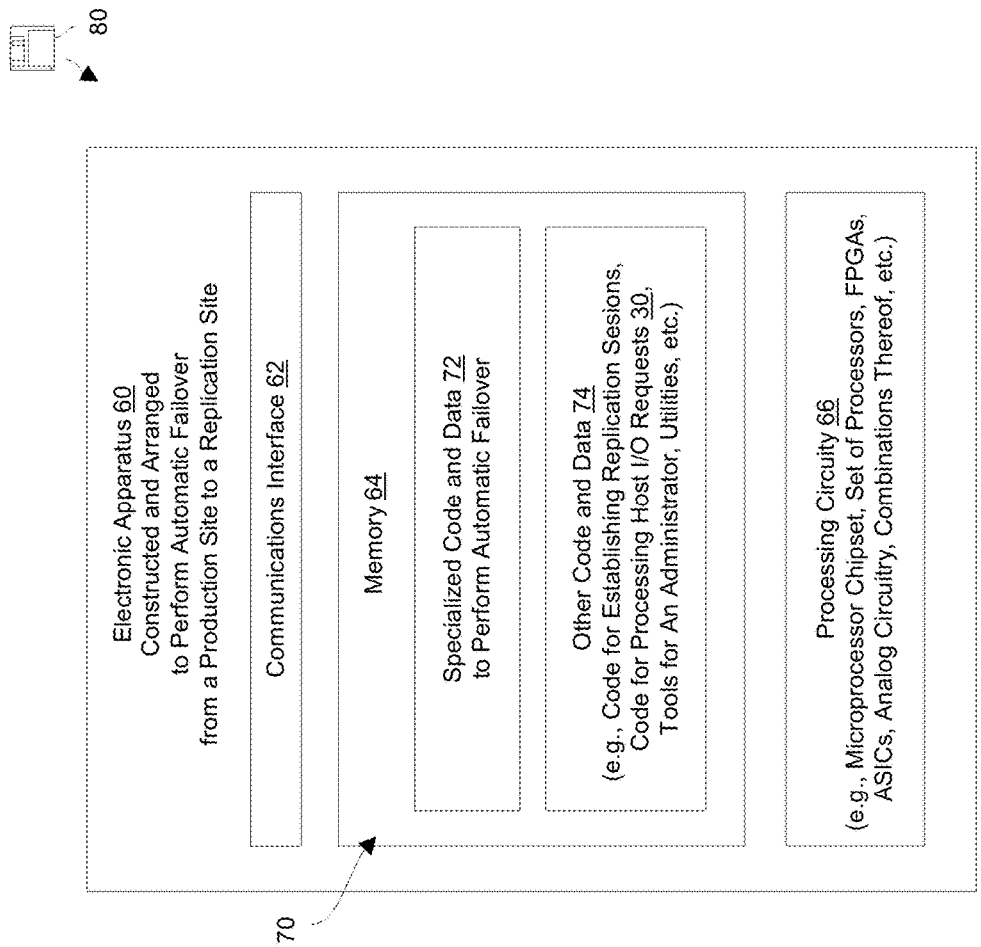
FIG. 2 is a block diagram of electronic circuitry of the data storage environment of FIG. 1.

FIG. 2 is a block diagram of electronic circuitry 60 of the data storage environment 20 which is constructed and arranged to automatically perform failover from a production site to a replication site. The electronic circuitry 60 includes a communications interface 62, memory 64, and processing circuitry 66. Although the electronic circuitry 60 may be separate from storage processing circuitry 40 of particular data storage equipment 24 (e.g., the electronic circuitry 60 may be part of a standalone/dedicated apparatus such as another device 28, part of a particular host computer 22, distributed among multiple devices, etc.), in some arrangements at least a portion of such circuitry is integrated with the storage processing circuitry 40 of the data storage equipment 24 (also see FIG. 1).

The communications interface 62 is constructed and arranged to connect the electronic circuitry 60 to the communications medium 26 (FIG. 1) to enable communications with other devices of the data storage environment 20. Such communications may be SAN-based, IP-based, cellular-based, cable-based, fiber-optic based, wireless, cloud-based, combinations thereof, and so on. Accordingly, the communications interface 62 enables the electronic circuitry 60 to robustly and reliably communicate with other external apparatus.

The memory 64 is intended to represent both volatile storage (e.g., DRAM, SRAM, etc.) and non-volatile storage (e.g., flash memory, magnetic memory, etc.). The memory 64 stores a variety of software constructs 70 including specialized code and data 72, and other code and data 74. The specialized code and data 72 is intended to represent a set of instructions that directs the processing circuitry 66 to perform automatic failover under certain conditions. The other code and data 74 refers generally to instructions that direct the processing circuitry 66 to perform various other operations, e.g., an operating system to manage computerized resources (processor cycles, memory space, etc.), drivers, code for processing host I/O requests 30, code for establishing and maintaining replication sessions 52 (also see FIG. 1), administrative tools, utilities, other user-level applications, and so on. When the electronic circuitry 60 forms part of particular data storage equipment 24 (FIG. 1), the memory 64 may further include the actual storage that supplies storage slices (e.g., extents of a predefined size such as 256 MB, 1 GB, etc.) forming a storage pool.

The processing circuitry 66 is constructed and arranged to operate in accordance with the various software constructs 70 stored in the memory 64. As will be explained in further detail shortly, the processing circuitry 64 when operating in accordance with the specialized code and data 72, forms specialized circuitry that controls automatic failover. Such processing circuitry 66 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 80 is capable of delivering all or portions of the software constructs 70 to the electronic circuitry 60. In particular, the computer program product 80 has a non-transitory (or non-volatile) computer readable medium which stores a set of instructions which controls one or more operations of the electronic circuitry 60. Examples of suitable computer readable storage media include tangible articles of manufacture and apparatus which store instructions in a non-volatile manner such as CD-ROM, flash memory, disk memory, tape memory, and the like. Further details will now be provided with reference to FIG. 3.

Figure 3:
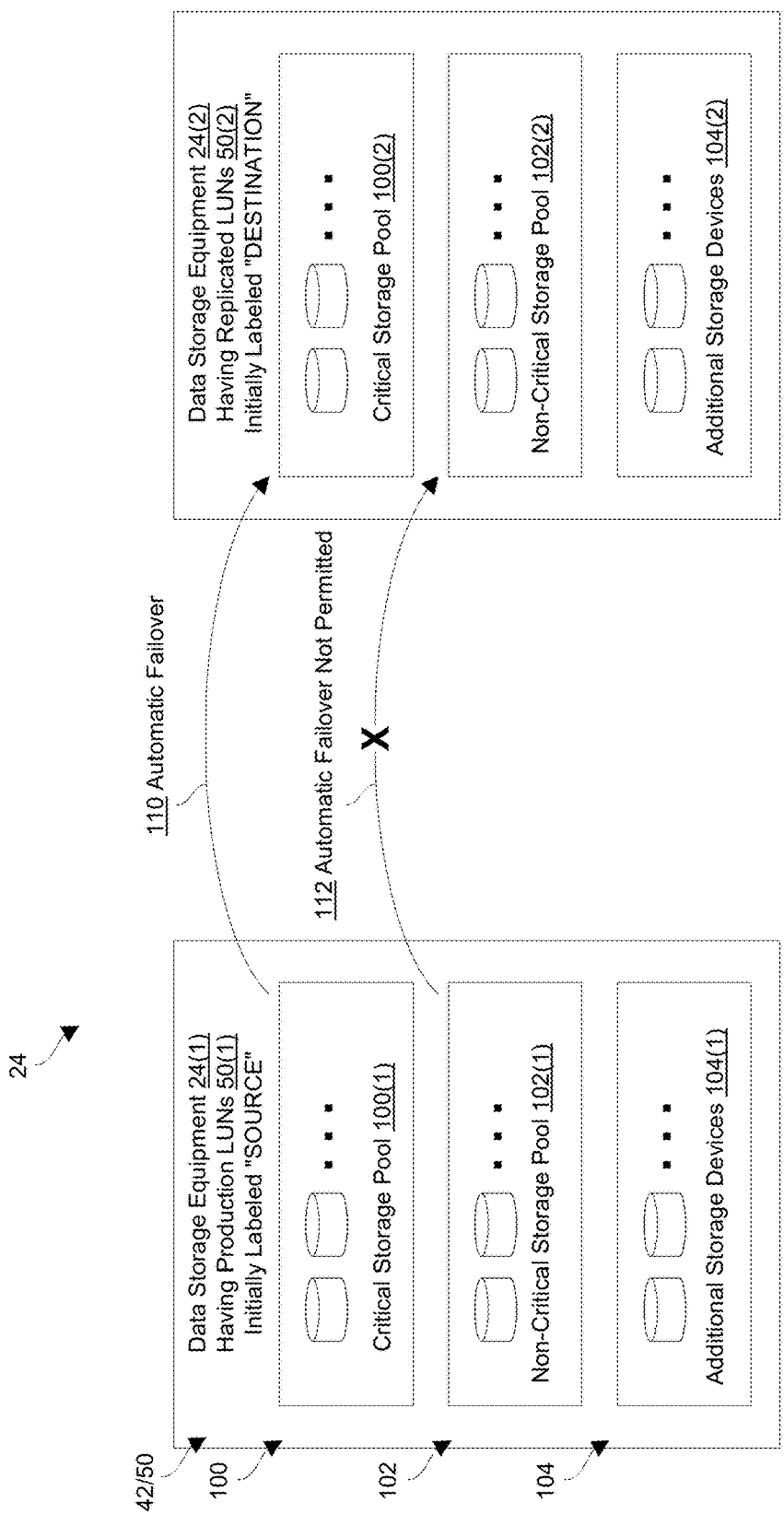
FIG. 3 is a block diagram illustrating particular details of storage pool details during automatic failover.

FIG. 3 shows particular storage pool details which control how automatic failover is carried out. As shown in FIG. 3, the production LUNs 50(1) on the data storage equipment 24(1) have replication settings that are initially set to "SOURCE" to indicate that they provide read/write access to the host computers 22. Additionally, the replicated LUNs 50(2) on the data storage equipment 24(2) have replication settings that are initially set to "DESTINATION" to indicate that they, at most, provide read only access to the host computers 22.

It should be understood that the data storage equipment 24(1) is shown as having only production LUNs 50(1), and that the data storage equipment 24(2) is shown as having only replicated LUNs 50(2) which replicate data from the production LUNs 50(1) for simplicity. Other data storage equipment 24 may have both production LUNs 50 initially set to "SOURCE" (for read/write access by the host computers 22) and replicated LUNs 50 initially set to "DESTINATION" (for read only access by the host computers 22).

As further shown in FIG. 3, each set of data storage equipment 24 includes three groups 100, 102, 104 of storage drives 42. In particular, the data storage equipment 24(1) includes three groups 100(1), 102(1), 104(1) of storage drives 42. The group 100(1) of storage drives 42 provides storage slices to form a critical storage pool (i.e., a priority setting for the storage pool is set to "critical"). The group 102(1) of storage drives 42 provides storage slices to form a non-critical storage pool (i.e., a priority setting for the storage pool is set to "non-critical"). The group 104(1) provides storage slices for additional storage (e.g., hot standby storage, storage to extend a storage pool, storage to perform data recovery, etc.).

Similarly, the data storage equipment 24(2) includes three groups 100(2), 102(2), 104(2) of storage drives 42. The group 100(2) provides storage slices to form a critical storage pool. The group 102(2) provides storage slices to form a non-critical storage pool. The group 104(2) provides storage slices for additional storage (e.g., hot standby storage, storage to extend a storage pool, storage to perform data recovery, etc.).

During operation, suppose that all of the production LUNs 50(1) on the data storage equipment 24(1) are replicated to the replicated LUNs 50(2) on the data storage equipment 24(2). If, at some point, there is an event which triggers failover from the data storage equipment 24(1) to the data storage equipment 24(2), automatic failover is permitted only for the production LUNs 50(1) residing in the critical storage pools 100. That is, failover for these production LUNs 50(1) occurs automatically (see the arrow 110) and involves the electronic circuitry 60 (FIG. 2) automatically re-labeling the replicated LUNs 50(2) on the data storage equipment 24(2) as "SOURCE" to indicate that host data 32 (FIG. 1) is permitted to be read from and written to the replicated LUNs 50(2) residing in the critical storage pool 100(2). Recall that the electronic circuitry 60 of FIG. 2 may reside in the data storage equipment 24, in a host computer 22, or in another external device 28.

However, in response to the event that triggers failover from the data storage equipment 24(1) to the data storage equipment 24(2), automatic failover is not permitted for the production LUNs 50(1) residing in the non-critical storage pools 102. That is, failover for these production LUNs 50(1) does not occur automatically (see the blocked arrow 112) and the replicated LUNs 50(2) are not automatically re-labeled as "SOURCE". Rather, if the event renders the data storage equipment 24(1) unavailable or unusable, the replicated LUNs 50(2) are available for manual failover and remain labeled as "DESTINATION" (for read only access by the host computers 22) until a user carries out manual failover in a standard manner. Accordingly, only LUNs 50 residing in critical storage pools 100 are available for automatic failover.

Furthermore, it should be understood that a variety of criteria are available for triggering automatic failover of the LUNs 50 in the critical storage pools 100. Along these lines, the various components of the data storage equipment 24(1) can be monitored for health, e.g., by the storage processing circuitry 40(1) (also see FIG. 1), by the host computers 22, by the storage processing circuitry 40(2) querying the storage processing circuitry 40(1), by a dedicated external device 28, and so on. In a similar manner, the data storage equipment 24(2) can be monitored for health.

Criteria that are suitable for triggering commencement of the automatic failover process include: detection of storage resources in offline states, a system entering service mode, production storage running out of space, and a user initiated failure of the production site, among others. Examples of events that can trigger automatic failover include failure of multiple storage drives 42 of the critical storage pool 100(1), a hardware failure such as a loss of a storage processor which significantly limits throughput on the data storage equipment 24(1), a local network module failure, a local battery failure, corrupted software on the data storage equipment 24(1), and so on.

If the data storage equipment 24(1) remains available but the electronic circuitry 60 determines that the health of the data storage equipment 24(1) has sufficiently degraded and that the data storage equipment 24(2) is sufficiently healthy to operate as a production site, the electronic circuitry 60 coordinates automatic failover of the LUNs 50 in the critical storage pool 100. Such a determination can be based on policy, application of predefined rules, etc. For example, to confirm that automatic failover is an acceptable course of action, the electronic circuitry 60 (FIG. 2) assesses the remaining storage capacity on the data storage equipment 24(2), the storage speed on the data storage equipment 24(2), bandwidth available to the data storage equipment 24(2), path health, and so on.

In some arrangements, automatic failure is triggered in response to reaching certain storage thresholds (or watermarks). For example, suppose that the level of available (i.e., free) storage in the critical storage pool 100(1) on the data storage equipment 24(1) has been shrinking and perhaps this deficiency has been neglected by the user. When the amount of free storage has shrunk to a first storage threshold or low watermark (e.g., 10% free storage available, 5% free storage available, etc.), the electric circuitry 60 may initiate an automatic failover process. In some arrangements, the data storage equipment 24(2) automatically informs the data storage equipment 24(2) of this event.

In response to this trigger, the data storage equipment 24(1) begins borrowing storage slices from the storage drives 42 in the group 104(1). Also, at this time, both the data storage equipment 24(1) and the data storage equipment 24(2) perform internal health assessments and communicate that information to the electronic circuitry 60 to confirm that automatic failover to the data storage equipment 24(2) would result in acceptable access to host data by the host computers 22. Along these lines, the critical storage pool 100(2) of the data storage equipment 24(2) may have more free storage available.

The data storage equipment 24(1) continues to lend storage from the group 104(1) of storage drives 42 to the critical storage pool 100(1) until storage consumption reaches a second threshold or high watermark (e.g., only 5% free storage available, only 2% free storage available, etc.). Once this high watermark is hit, the electronic circuitry 60 executes automatic failover. That is, failover for these production LUNs 50(1) occurs automatically (see the arrow 110) without any user intervention, and involves automatic re-labeling the replicated LUNs 50(2) on the data storage equipment 24(2) as "SOURCE" to indicate that host data is permitted to be read from and written to the replicated LUNs 50(2). Such operation bought additional time for the user to take remedial action to avoid failover (e.g., by deleting snapshots to free up storage space, to add more storage drives, etc.), but nevertheless performed automatic failover to maintain data high availability since the user was unable to perform remedial action in time.

As yet another example, the user is able to purposefully direct the data storage equipment 24(1), 24(2) to automatically failover production LUNs 50(1) in the critical storage pool 100(1) to the replicated LUNs 50(2) in the critical storage pool 100(2) (i.e., planned automated failover). Along these, the user may wish to make the data storage equipment 24(1) temporarily unavailable (e.g., to upgrade or replace a component, to retire equipment, for a tech refresh, etc.). Accordingly, automated failover is capable of being scheduled (not just unplanned). In these situations, automatic failover is less burdensome and the likelihood of user error can be significantly reduced since the user can rely on the electronic circuitry 60 to properly perform a health assessment of the data storage equipment 24(2) and properly execute automated failover.

It should be understood that once the electronic circuitry 60 concludes that automatic failover should occur, failover is performed immediately to maintain data high availability to the host computers 22. If replication was performed synchronously, there is no opportunity for data loss. However, if replication was performed asynchronously, some data loss may be possible but can be controlled by design (e.g., at most 2 minutes worth, at most 5 minutes worth, etc.) based on the maximum asynchronous delay, etc. Further details will now be provided with reference to FIG. 4.

Figure 4:
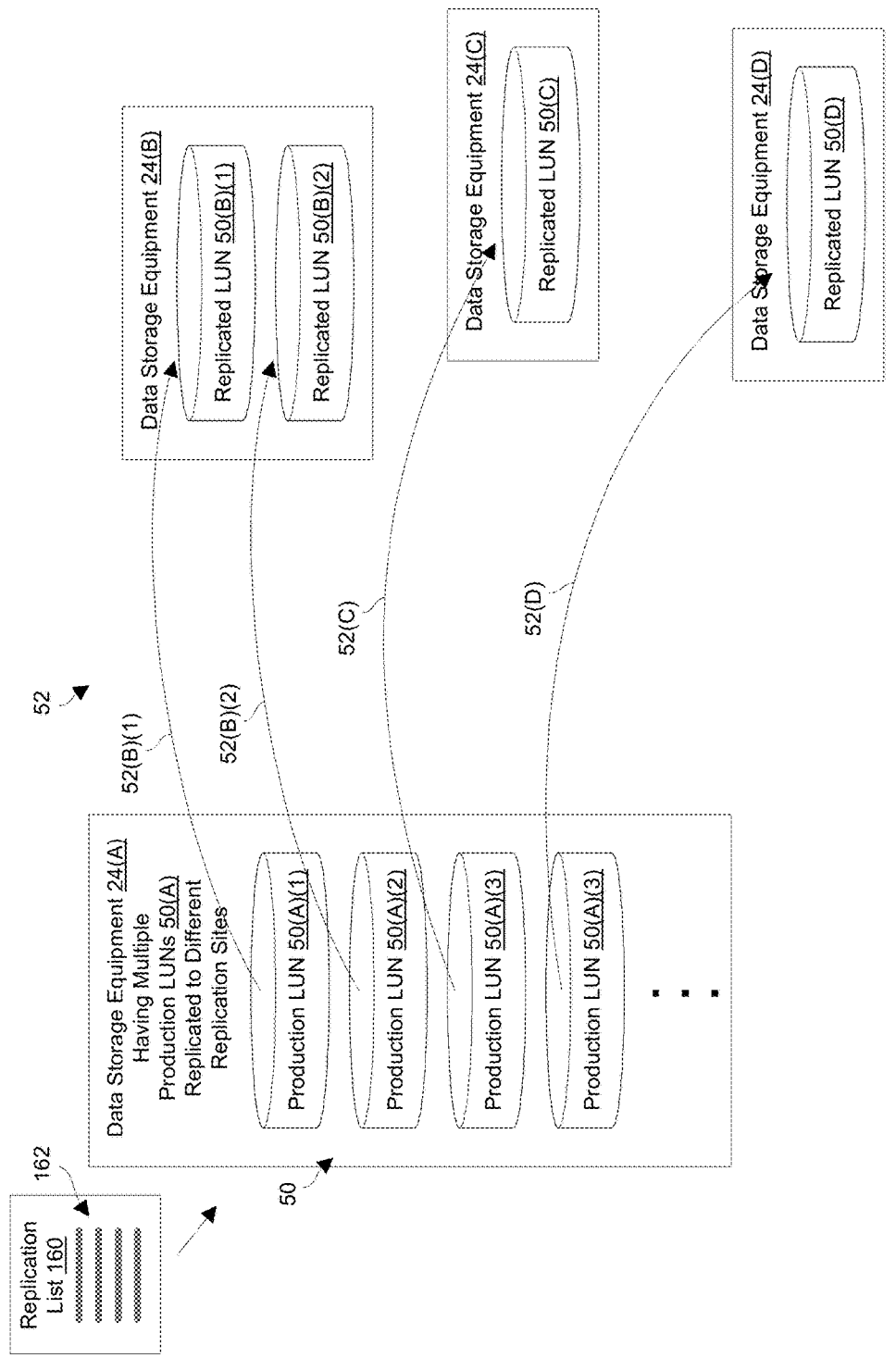
FIG. 4 is a block diagram illustrating particular details of automatic failover based on a list of multiple storage objects.

FIG. 4 shows particular details of automatic failover based on a list 160 of entries 162 which identify respective replication sessions 52 to multiple replication sites. Each entry 162 stores information regarding a particular replication session 52 (e.g., source LUN, destination LUN, synchronous vs. asynchronous, consistency group information, time of creation, etc.). Such a replication list 160 is managed and maintained by the electronic circuitry 60 (e.g., see the specialized code and data 72 in FIG. 2).

As shown in FIG. 4, a replication session 52(B)(1) replicates data from a production LUN 50(A)(1) on data storage equipment 24(A) to a replicated LUN 50(B)(1) on data storage equipment 24(B). Similarly, a replication session 52(B)(2) replicates data from a production LUN 50(A)(2) on the data storage equipment 24(A) to a replicated LUN 50(B)(2) on the data storage equipment 24(B). Additionally, a replication session 52(C) replicates data from a production LUN 50(A)(3) on the data storage equipment 24(A) to a replicated LUN 50(C) on data storage equipment 24(C). Furthermore, a replication session 52(D) replicates data from a production LUN 50(A)(4) on the data storage equipment 24(A) to a replicated LUN 50(D) on data storage equipment 24(D).

The replication list 160 of entries 162 enables the electronic circuitry 60 (FIG. 2) to carry out failover en masse or in bulk (i.e., multiple failovers at once). In particular, the user adds entries 162 to the list 160 as the user creates new replication sessions 50. By way of example, the replication sessions 52 may be to different replication sites, i.e., other data storage equipment 24.

Later, if there is a triggering event that causes automatic failover from the data storage equipment 24(A), automatic failover is carried out based on the list 160. That is, the electronic circuitry 60 directs automatic failover based on the entries 162 on the list 160. In some arrangements, the user is able to purposefully initiate failover based on the list 160 (e.g., when the user needs to make the data storage equipment 24(A) unavailable for a period of time). Such operation alleviates the need for the user to direct failover to the replicated LUNs 50 individually which would be tedious, burdensome, and perhaps error prone. Further details will now be provided with reference to FIG. 5.

Figure 5:
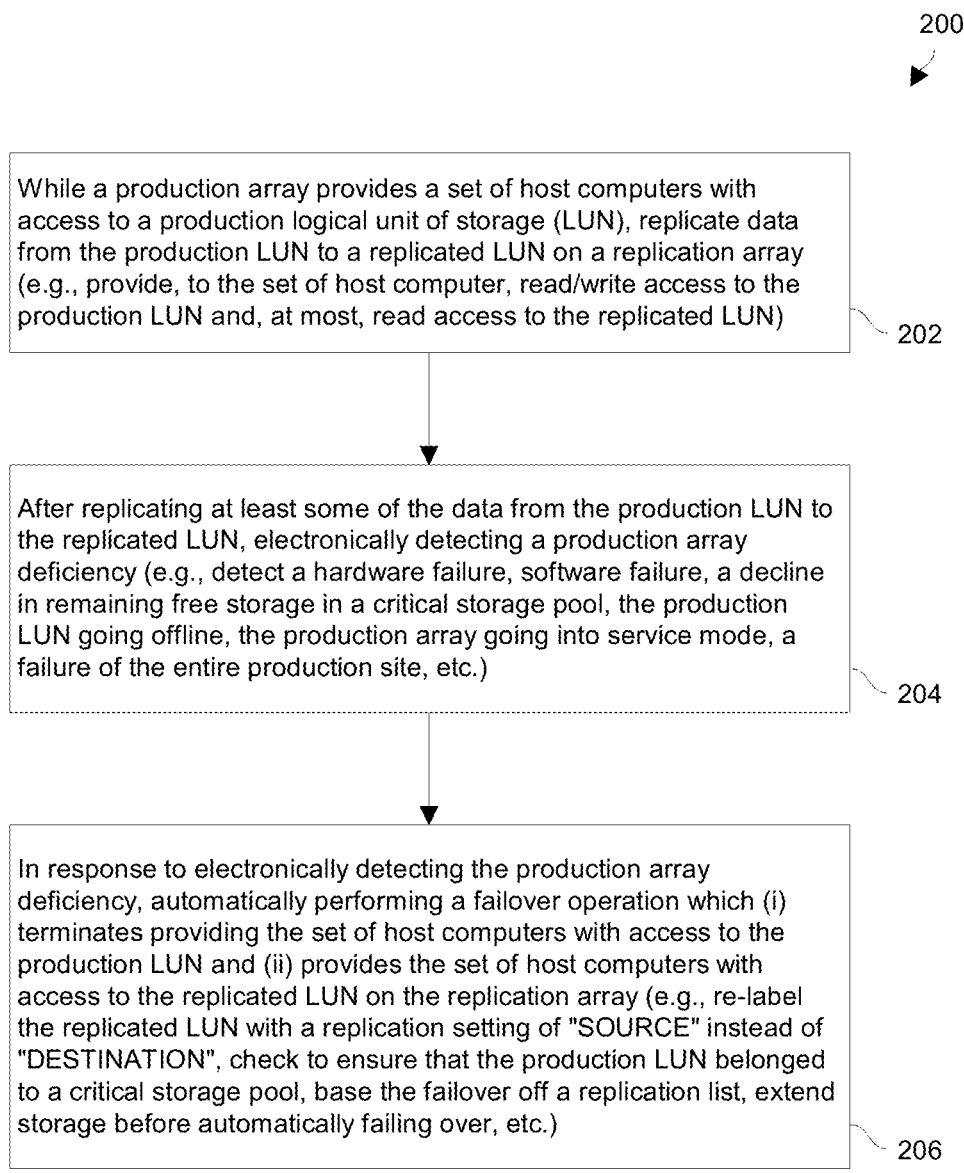
FIG. 5 is a flowchart of a procedure which is performed by the electronic circuitry of FIG. 2.

FIG. 5 is a flowchart of a procedure 200 which provides data high availability to a set of host computers (also see FIG. 1). In some arrangements, the procedure 200 is performed exclusively by data storage equipment 24 (e.g., coordinated by a production array and a replication array). In other arrangements, at least some of the procedure 200 involves external circuitry (e.g., participation by a host computer, by an external device, etc.).

At 200, the procedure 200 involves, while a production array provides the set of host computers with access to a production LUN, replicating data from the production LUN to a replicated LUN on a replication array via a replication session. During this time, host computers may have read/write access to the production LUN, but only read access to the replicated LUN.

At 202, the procedure 200 involves, after replicating at least some of the data from the production LUN to the replicated LUN, electronically detecting a production array deficiency. For example, the production array may have succumbed to hardware failure, a software failure, a severe decline remaining free storage in a critical storage pool, and so on. More significant deficiencies include the production LUN going offline, the production array going into service mode, or perhaps even failure of the entire production site.

At 204, the procedure involves, in response to electronically detecting the production array deficiency, automatically performing a failover operation which (i) terminates providing the set of host computers with access to the production LUN and (ii) provides the set of host computers with access to the replicated LUN on the replication array. Here, the replicated LUN is re-labeled as "SOURCE" instead of "DESTINATION". Additionally, confirmation is made that the production LUN belonged to a storage pool having a priority setting set to "critical" (vs. "non-critical"). In some arrangements, the automated failover is based off a replication list 160 (also see FIG. 4). In some arrangements in which the automatic failover process is triggered due to low remaining free storage, storage is borrowed from standby storage drives to extend a storage pool containing the production LUN prior to executing automatic failover.

As described above, improved techniques are directed to providing data high availability to a set of host computers 22 via automatic failover. In particular, data is replicated from a production location to a replication location. The operation of the production location is monitored and, in response to detection of a deficiency of the production location (e.g., reaching a low free storage threshold, failure of an internal component, etc.), failover to the replication location is automatically performed. Accordingly, there is minimal burden and opportunity for error placed on a user if any. Additionally, failover and the resulting access to the data from the replication location is not unnecessarily delayed while waiting for a human to intervene.

One should appreciate that the above-described techniques do not merely perform well-known steps that are conventionally performed by a human. Rather, the disclosed techniques involve systematic assessments of equipment at computer speeds to electronically evaluate whether to execute failover to improve failover speed (i.e., to eliminate delay). With the automated failover techniques, other advantages are available as well such as extending free storage of a storage pool (e.g., based on low and high watermarks), selectively failing over certain LUNs automatically and not others based on whether the LUNs reside in critical storage pools, and so on. Such operations are clearly improvements to the technology, as well as remove the burden and possibility of making a human error from the user.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as the host computers 22, the other devices 28, etc. are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting SAN-based communications, LAN-based communications, combinations thereof, and so on.

It should be understood that the techniques disclosed herein are able to use existing platforms to carry out automatic failover. That is, there is no need to insert an appliance between hosts and storage arrays (e.g., as a front-end to the hosts). Additionally, such techniques can be performed without use of virtualization (e.g., no virtual machines or virtualization environment needed). Accordingly, the hosts are able to enjoy less levels of processing that could otherwise impose delays/latency/etc.

It should be further understood that the above described techniques were described in the context of LUN replication, e.g., splitting writes to LUNs. It should be understood that such automated failover techniques are suitable for failing over any type of data storage object such as those from block level replication, file system replication, combinations thereof, and so on. Moreover, such automatic failover is suitable for failing over to other local equipment (i.e., from local replication) and/or remote equipment (i.e., remote replication).

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A computer-implemented method of providing data high availability to a set of host computers, the computer-implemented method comprising:
   while a production array provides the set of host computers with access to a production logical unit of storage (LUN), replicating data from the production LUN to a replicated LUN on a replication array, wherein the production LUN resides in a particular storage pool and wherein the particular storage pool in which the production LUN resides comprises a critical storage pool that is one of a plurality of storage pools located in the production array;
   after replicating at least some of the data from the production LUN to the replicated LUN, electronically detecting (i) a production array deficiency and (ii) that the replication array is sufficiently healthy to operate as a production site, wherein detecting that the replication array is sufficiently healthy to operate as a production site includes performing an internal health assessment on the replication array that determines that a critical storage pool that is one of a plurality of storage pools located in the replication array has more free storage available than the critical storage pool located in the production array; and
   in response to electronically detecting the production array deficiency and that the replication array is sufficiently healthy to operate as a production site, automatically performing, by electronic circuitry, immediately and without user interaction, a failover operation which (i) terminates providing the set of host computers with access to the production LUN and (ii) provides the set of host computers with access to the replicated LUN on the replication array, wherein automatically performing the failover operation includes initiating the failover operation in response to a result of an internal status assessment of the production array indicating that the production array has the production array deficiency, and wherein initiating the failover operation includes i) discovering that a level of remaining free storage in the particular storage pool has reached a predefined threshold, and ii) commencing the failover operation in response to discovery that the level of remaining free storage in the particular storage pool has reached the predefined threshold.

2. A computer-implemented method as in claim 1 wherein each LUN has a replication setting;
wherein, while the production array provides the set of host computers with access to the production LUN and data is replicated from the production LUN to the replicated LUN, the replication setting of the production LUN on the production array is set to "SOURCE";
wherein, while the production array provides the set of host computers with access to the production LUN and data is replicated from the production LUN to the replicated LUN, the replication setting of the replicated LUN on the replication array is set to "DESTINATION"; and
wherein performing the failover operation includes modifying the replication setting of the replicated LUN on the replication array from "DESTINATION" to "SOURCE".

3. A computer-implemented method as in claim 1 wherein the electronic circuitry is constructed and arranged to automatically failover LUNs residing in critical storage pools having priority settings set to "critical" and not automatically failover LUNs residing in non-critical storage pools having priority settings set to "non-critical"; and
wherein automatically performing the failover operation includes:
reading the priority setting of the particular storage pool,
detecting that the priority setting of the particular storage pool is set to "critical", and
initiating the failover operation in response to detection that the priority setting of the particular storage pool is set to "critical".

4. A computer-implemented method as in claim 1 wherein the electronic circuitry maintains a replication list for the production array, the replication list listing multiple LUNs; and wherein automatically performing the failover operation includes:
in response to electronically detecting the production array deficiency, failing over each LUN of the multiple LUNs listed by the replication list, the multiple LUNs including the production LUN.

5. A computer-implemented method as in claim 4 wherein the replication list for the production array includes multiple replication session entries, each replication session entry of the replication list identifying a respective replication session; and
wherein failing over each LUN of the multiple LUNs listed by the replication list includes:
in response to electronically detecting the production array deficiency, automatically performing a bulk failover operation in which (i) access to a first production LUN on the production array is replaced with access to a first replicated LUN on a first replication array, and (ii) access to a second production LUN on the production array is replaced with access to a second replicated LUN on a second replication array that is different from the first replication array.

6. A computer-implemented method as in claim 5 wherein the production array deficiency is detected at a first time;
wherein performance of the bulk failover operation is initiated at a second time; and
wherein the electronic circuitry operates to commence the bulk failover operation between the first time and the second time without human intervention.

7. A computer-implemented method as in claim 1 wherein initiating the failover operation includes:
discovering that the production array has sustained a component failure which has caused operation of the production array to degrade, and
commencing the failover operation in response to discovery that the production array has sustained the component failure.

8. A computer-implemented method as in claim 1, further comprising:
prior to commencing the failover operation, adding free storage from a set of standby storage devices to the particular storage pool to extend the particular storage pool and delay commencement of the failover operation.

9. A computer-implemented method as in claim 1 wherein replicating data from the production LUN to the replicated LUN occurs synchronously; and wherein automatically performing the failover operation includes:
completing the failover operation with no loss of data between the production array and the replication array.

10. A computer-implemented method as in claim 1 wherein replicating data from the production LUN to the replicated LUN occurs asynchronously; and wherein automatically performing the failover operation includes:
completing the failover operation with a maximum loss of 5 minutes of data between the production array and the replication array.

11. The computer implemented method as in claim 1, wherein initiating the failover operation further comprises:
in response to discovering that the level of remaining free storage in the critical storage pool has reached the first predefined threshold, and prior to commencing the failover operation, beginning to automatically add free storage from a set of standby storage devices to the critical storage pool to delay commencement of the failover operation;
after beginning to automatically add free storage from the set of standby storage devices to the critical storage pool, automatically discovering that the level of remaining free storage in the critical storage pool has reached a second threshold; and
in response to automatically discovering that the level of remaining free storage in the critical storage pool has reached the second threshold, commencing the failover operation without user interaction.

12. Electronic circuitry, comprising:
memory; and
control circuitry coupled to the memory, the memory storing instructions which, when carried out by the control circuitry, cause the control circuitry to:
while a production array provides a set of host computers with access to a production logical unit of storage (LUN), replicate data from the production LUN to a replicated LUN on a replication array, wherein the production LUN resides in a particular storage pool and wherein the particular storage pool in which the production LUN resides comprises a critical storage pool that is one of a plurality of storage pools located in the production array, after replicating at least some of the data from the production LUN to the replicated LUN, electronically detect (i) a production array deficiency and (ii) that the replication array is sufficiently healthy to operate as a production site, wherein the replication array is detected to be sufficiently healthy to operate as a production site at least in part by performance of an internal health assessment on the replication array that determines that a critical storage pool that is one of a plurality of storage pools located in the replication array has more free storage available than the critical storage pool located in the production array, and in response to electronically detecting the production array deficiency and that the replication array is sufficiently healthy to operate as a production site, automatically perform a failover operation, immediately and without user interaction, which (i) terminates providing the set of host computers with access to the production LUN and (ii) provides the set of host computers with access to the replicated LUN on the replication array, wherein the failover operation is automatically performed at least in part by initiating the failover operation in response to a result of an internal status assessment of the production array indicating that the production array has the production array deficiency, and wherein the failover operation is initiated at least in part by i) discovering that a level of remaining free storage in the particular storage pool has reached a predefined threshold, and ii) commencing the failover operation in response to discovery that the level of remaining free storage in the particular storage pool has reached the predefined threshold.

13. Electronic circuitry as in claim 12 wherein each LUN has a replication setting;

wherein, while the production array provides the set of host computers with access to the production LUN and data is replicated from the production LUN to the replicated LUN, the replication setting of the production LUN on the production array is set to "SOURCE";

wherein, while the production array provides the set of host computers with access to the production LUN and data is replicated from the production LUN to the replicated LUN, the replication setting of the replicated LUN on the replication array is set to "DESTINATION"; and wherein the control circuitry, when performing the failover operation, is further constructed and arranged to modify the replication setting of the replicated LUN on the replication array from "DESTINATION" to "SOURCE".

14. Electronic circuitry as in claim 13 wherein the control circuitry is constructed and arranged to automatically failover LUNs residing in critical storage pools having priority settings set to "critical" and not automatically failover LUNs residing in non-critical storage pools having priority settings set to "non-critical"; and wherein the control circuitry, when initiating the failover operation, is constructed and arranged to:
read the priority setting of the particular storage pool, detect that the priority setting of the particular storage pool is set to "critical", and
commence the failover operation in response to detection that the priority setting of the particular storage pool is set to "critical".

15. Electronic circuitry as in claim 14 wherein the memory maintains a replication list for the production array, the replication list listing multiple LUNs; and wherein the control circuitry, when automatically performing the failover operation is constructed and arranged to:
in response to electronically detecting the production array deficiency, fail over each LUN of the multiple LUNs listed by the replication list, the multiple LUNs including the production LUN.

16. A computer program product having a non-transitory computer readable medium which stores a set of instructions to provide data high availability to a set of host computers; the set of instructions, when carried out by computerized circuitry, causing the computerized circuitry to perform a method of:

while a production array provides the set of host computers with access to a production logical unit of storage (LUN), replicating data from the production LUN to a replicated LUN on a replication array, wherein the production LUN resides in a particular storage pool and wherein the particular storage pool in which the production LUN resides comprises a critical storage pool that is one of a plurality of storage pools located in the production array;

after replicating at least some of the data from the production LUN to the replicated LUN, electronically detecting (i) a production array deficiency and (ii) that the replication array is sufficiently healthy to operate as a production site, wherein detecting that the replication array is sufficiently healthy to operate as a production site includes performing an internal health assessment on the replication array that determines that a critical storage pool that is one of a plurality of storage pools located in the replication array has more free storage available than the critical storage pool located in the production array; and in response to electronically detecting the production array deficiency and that the replication array is sufficiently healthy to operate as a production site, automatically performing a failover operation, immediately and without user interaction, which (i) terminates providing the set of host computers with access to the production LUN and (ii) provides the set of host computers with access to the replicated LUN on the replication array, wherein automatically performing the failover operation includes initiating the failover operation in response to a result of an internal status assessment of the production array indicating that the production array has the production array deficiency, and wherein initiating the failover operation includes i) discovering that a level of remaining free storage in the particular storage pool has reached a predefined threshold, and ii) commencing the failover operation in response to discovery that the level of remaining free storage in the particular storage pool has reached the predefined threshold.

17. A computer program product as in claim 16, further comprising:
wherein each LUN has a replication setting;
wherein, while the production array provides the set of host computers with access to the production LUN and data is replicated from the production LUN to the replicated LUN, the replication setting of the production LUN on the production array is set to "SOURCE";
wherein, while the production array provides the set of host computers with access to the production LUN and data is replicated from the production LUN to the replicated LUN, the replication setting of the replicated LUN on the replication array is set to "DESTINATION";

wherein performing the failover operation includes modifying the replication setting of the replicated LUN on the replication array from "DESTINATION" to "SOURCE";

wherein the computerized circuitry is constructed and arranged to automatically failover LUNs residing in critical storage pools having priority settings set to "critical" and not automatically failover LUNs residing in non-critical storage pools having priority settings set to "non-critical"; and wherein initiating the failover operation includes:
reading the priority setting of the particular storage pool,
detecting that the priority setting of the particular storage pool is set to "critical", and
commencing the failover operation in response to detection that the priority setting of the particular storage pool is set to "critical".

18. A computer program product as in claim 17 wherein the computerized circuitry maintains a replication list for the production array, the replication list listing multiple LUNs; and wherein automatically performing the failover operation includes:

in response to electronically detecting the production array deficiency, failing over each LUN of the multiple LUNs listed by the replication list, the multiple LUNs including the production LUN.

19. A computer program product as in claim 18 wherein commencing the failover operation includes:

discovering that the production array has sustained a component failure which has caused operation of the production array to degrade, and
starting the failover operation in response to discovery that the production array has sustained the component failure.

* * * * *